United States Patent
Nakano et al.

(10) Patent No.: US 10,403,877 B2
(45) Date of Patent: Sep. 3, 2019

(54) MANUFACTURING METHOD OF ELECTRODE AND MANUFACTURING APPARATUS OF ELECTRODE

(71) Applicant: TOYOTA JIDOSHA KABUSHIKI KAISHA, Toyota-shi, Aichi-ken (JP)

(72) Inventors: Takahiko Nakano, Seto (JP); Katsushi Enokihara, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 53 days.

(21) Appl. No.: 15/634,168

(22) Filed: Jun. 27, 2017

(65) Prior Publication Data

US 2018/0006292 A1  Jan. 4, 2018

(30) Foreign Application Priority Data

Jun. 29, 2016 (JP) ................................. 2016-128418
Mar. 22, 2017 (JP) ................................. 2017-056273

(51) Int. Cl.

| H01M 4/04 | (2006.01) |
|---|---|
| H01M 4/1391 | (2010.01) |
| H01M 4/1393 | (2010.01) |
| H01M 4/485 | (2010.01) |
| H01M 4/587 | (2010.01) |
| H01M 4/66 | (2006.01) |
| H01M 10/0525 | (2010.01) |

(Continued)

(52) U.S. Cl.
CPC ....... *H01M 4/0409* (2013.01); *H01M 4/1391* (2013.01); *H01M 4/1393* (2013.01); *H01M 4/485* (2013.01); *H01M 4/587* (2013.01); *H01M 4/661* (2013.01); *H01M 10/0525* (2013.01); *H01M 10/0587* (2013.01); *B29C 39/14* (2013.01); *B32B 37/025* (2013.01)

(58) Field of Classification Search
CPC ......... H01M 10/0525; H01M 10/0587; H01M 4/0409; H01M 4/1391; H01M 4/1393; H01M 4/485; H01M 4/587; H01M 4/661; B32B 37/025; B29C 39/14
USPC ...................... 156/247, 582, 583.1; 29/592.1
See application file for complete search history.

(56) References Cited

U.S. PATENT DOCUMENTS

| 6,280,879 B1* | 8/2001 | Andersen ................ H01M 4/04 29/623.3 |
|---|---|---|
| 2002/0098414 A1* | 7/2002 | Ovshinsky ............... B60K 1/04 429/223 |
| 2012/0094196 A1* | 4/2012 | Eickhoff ................. C01B 3/065 429/414 |

FOREIGN PATENT DOCUMENTS

| JP | 2003-117462 A | 4/2003 |
|---|---|---|
| JP | 2015-201318 A | 11/2015 |

OTHER PUBLICATIONS

Translation of JP2003117462.*
Notification for Refusal of KR20170078864 (dated 2018).*
Reply to Notification for Refusal of KR20170078864 (dated 2018).*

* cited by examiner

*Primary Examiner* — Sonya M Sengupta
(74) *Attorney, Agent, or Firm* — Sughrue Mion, PLLC

(57) ABSTRACT

A manufacturing method manufactures an electrode by use of a manufacturing apparatus including a B-roll configured to convey granules, a C-roll configured to convey a metal foil, and a cooling portion configured to cool down the metal foil on an upstream side relative to the C-roll in terms of a conveying direction of the metal foil. Further, the manufacturing apparatus cools down the metal foil by use of the cooling portion, supplies the metal foil thus cooled down by (Continued)

the cooling portion to the C-roll, and transfers the granules to the metal foil in a deposition gap between the B-roll and the C-roll.

12 Claims, 10 Drawing Sheets

(51) Int. Cl.
*H01M 10/0587* (2010.01)
*B32B 37/00* (2006.01)
*B29C 39/14* (2006.01)

DEW POINT TEMPERATURE (°C)

| TEMPERA-TURE (°C) \ RELATIVE HUMIDITY (%) | 40 | 50 | 60 | 70 |
|---|---|---|---|---|
| 30 | 14.9 | 18.4 | 21.4 | 23.9 |
| 25 | 10.5 | 13.9 | 16.7 | 19.1 |
| 23 | 8.7 | 12.0 | 14.8 | 17.2 |
| 21 | 6.9 | 10.2 | 12.9 | 15.3 |
| 18 | 4.2 | 7.4 | 10.1 | 12.5 |

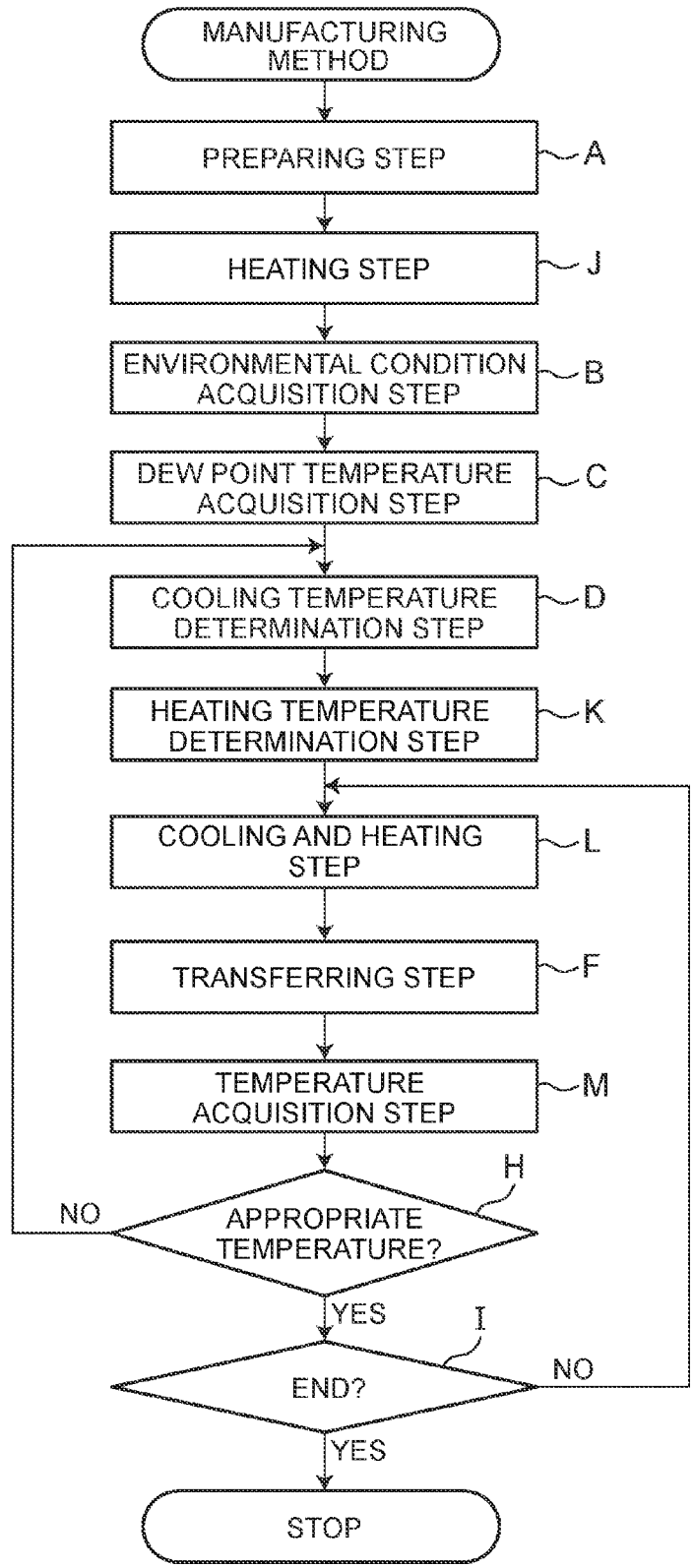

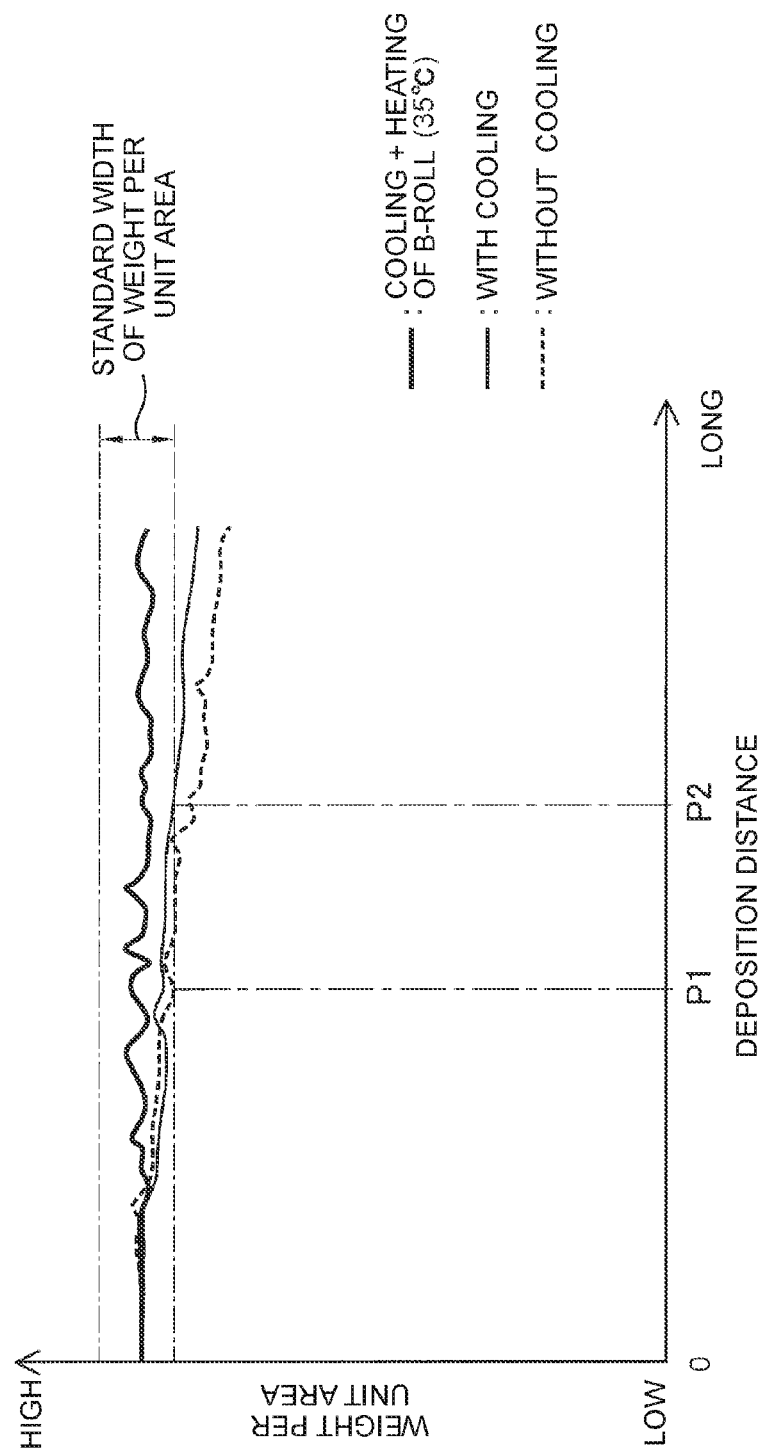

MANUFACTURING METHOD OF ELECTRODE AND MANUFACTURING APPARATUS OF ELECTRODE

INCORPORATION BY REFERENCE

The disclosure of Japanese Patent Application No. 2017-056273 filed on Mar. 22, 2017 including the specification, drawings and abstract and the disclosure of Japanese Patent Application No. 2016-128418 filed on Jun. 29, 2016 including the specification, drawings and abstract are incorporated herein by reference in its entirety.

BACKGROUND

1. Technical Field

The present disclosure relates to a manufacturing method of manufacturing an electrode by transferring, to a metal foil, an active-material material as a material containing active material so that the electrode includes the metal foil and a layer of the active-material material in a laminated manner, and the present disclosure also relates to a manufacturing apparatus thereof.

2. Description of Related Art

A sheet-shaped electrode in which an active material layer is formed on a surface of a metal foil is used for a lithium-ion secondary battery, for example. A document that discloses a manufacturing method of a sheet-shaped electrode is Japanese Patent Application Publication No. 2015-201318 (JP 2015-201318 A), for example. JP 2015-201318 A discloses a manufacturing method in which wet granules including active material particulates, a binder, and a solvent are molded in a flat shape or a block shape, and a resultant formed body and a metal foil are conveyed separately by rolls, so that the formed body is transferred to the metal foil between the rolls.

SUMMARY

However, the related art described above has the following possibility. That is, at the time of transferring an active-material material to the metal foil, the active-material material is compressed in a gap between a surface of the roll conveying the active material and a surface of the roll conveying the metal foil, so that processing heat is generated. Accordingly, if the manufacture is performed continuously for a long period of time, the processing heat thus generated accumulates in the rolls, so that the rolls tend to expand. If at least one of the rolls expands, a distance of the gap is shortened, which tends to decrease a thickness of an active material layer of an electrode to be manufactured.

The present disclosure provides a manufacturing method of an electrode, and the manufacturing method can be expected to allow a thickness of an active material layer to fall within an appropriate range even if the manufacture of the electrode is performed continuously for a long period of time.

A manufacturing method of manufacturing an electrode, according to one aspect of the disclosure, is a manufacturing method of manufacturing an electrode by use of a first roll configured to convey an active-material material as a material containing an active material, and a second roll placed adjacent to the first roll in parallel to each other so as to convey a foil, such that the active-material material is transferred to the foil by rotating the first roll and the second roll in directions reverse to each other so as to form a layer of the active-material material on a surface of the foil, and the manufacturing method includes cooling down the foil by use of a cooling device on an upstream side relative to the second roll in terms of a conveying direction of the foil.

With the manufacturing method of manufacturing the electrode in the above one aspect, the foil is cooled down by the cooling device before the foil reaches between the first roll and the second roll. When the active-material material is transferred to the foil thus cooled down, most processing heat generated in a transferring step is highly likely to be consumed by a temperature increase of the foil. Accordingly, heat accumulation is restrained both in the first roll and the second roll, thereby restraining expansion of the rolls. Hereby, it can be expected that a thickness of an active material layer falls within its appropriate range even if the manufacture of the electrode is performed continuously for a long period of time.

Further, it is desirable that the cooling device include a cooling roll; and at a time of cooling down the foil, the foil be cooled down such that the foil is brought into contact with the cooling roll while an outer peripheral surface of the cooling roll is maintained at a temperature lower than an air temperature of a manufacture environment. By bringing the foil into contact with the cooling roll having a low temperature, the foil is highly likely to be cooled down uniformly.

Further, it is desirable that: the cooling device include a refrigerant supply portion configured to supply refrigerant to the cooling roll; and at the time of cooling down the foil, the refrigerant supply portion cause the refrigerant having a temperature lower than the air temperature of the manufacture environment to flow through the cooling roll. By supplying the refrigerant to the refrigerant supply portion, it can be expected that a surface temperature of the cooling roll is maintained appropriately.

Further, it is desirable that, at the time of cooling down the foil, the foil be cooled down such that a temperature of the foil after the cooling is lower than the air temperature of the manufacture environment and is higher than a dew point temperature of the manufacture environment. By cooling the foil to the temperature lower than the air temperature of the manufacture environment, a cooling effect is increased. Further, by cooling the foil to the temperature higher than the dew point temperature, it is possible to restrain adherence of water drops to the foil.

Further, it is desirable that: the cooling device include a sensor configured to output a signal that varies depending on the air temperature and a relative humidity of the manufacture environment; and at the time of cooling down the foil, a temperature to cool down the foil in the cooling device be determined such that the air temperature and the relative humidity of the manufacture environment are acquired based on an output signal of the sensor, a dew point temperature is acquired from the air temperature and the relative humidity thus acquired, and further, the temperature of the foil after the cooling is lower than the air temperature thus acquired and is higher than the dew point temperature thus acquired. If information of the manufacture environment is acquired to automatically determine the temperature to cool down the foil based on the information thus determined, a possibility that a manufacturing process can be automated increases.

Further, the manufacturing method may include heating the first roll such that a temperature of an outer peripheral surface of the first roll is higher, by a predetermined temperature or more, than the temperature of the foil after the cooling. Since the temperature of the outer peripheral surface of the first roll is higher than the temperature of the foil by the predetermined temperature or more, most processing heat generated herein moves to the foil. Accordingly, heat accumulation to the first roll is further restrained.

Further, the present specification discloses a manufacturing apparatus of manufacturing an electrode such that an active-material material as a material containing an active material is transferred to a foil so as to form a layer of the active-material material on a surface of the foil, and the manufacturing apparatus includes: a first roll configured to convey the active-material material; a second roll placed adjacent to the first roll in parallel to each other so as to convey the foil; and a cooling roll placed at a position where the cooling roll makes contact with the foil on an upstream side relative to the second roll in terms of a conveying direction of the foil, the cooling roll being configured such that a passage through which refrigerant passes is formed inside the cooling roll.

Further, it is desirable that the manufacturing apparatus of manufacturing the electrode include a refrigerant supply portion configured to supply the refrigerant to the cooling roll. Further, it is desirable that a plurality of cooling rolls be provided. With such a configuration, the cooling roll is highly likely to surely cool down the foil to an appropriate temperature.

Further, it is desirable that the manufacturing apparatus of manufacturing the electrode include a heating portion configured to heat the first roll. Since the first roll is heated, most processing heat generated herein further surely moves to the foil.

The present disclosure achieves a manufacturing method of an electrode, with which it can be expected that a thickness of an active material layer falls within its appropriate range even if the manufacture of the electrode is performed continuously for a long period of time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10 is a process drawing illustrating a manufacturing method by the manufacturing apparatus of the second embodiment; and FIG. 11 is a graph illustrating a result of an electrode manufacturing experiment.

DETAILED DESCRIPTION OF EMBODIMENTS

The following describes a first embodiment that embodies the present disclosure in detail with reference to the attached drawings. The present embodiment is obtained such that the present disclosure is applied to a manufacturing apparatus used in a process of manufacturing a belt-shaped electrode.

Figure 1:
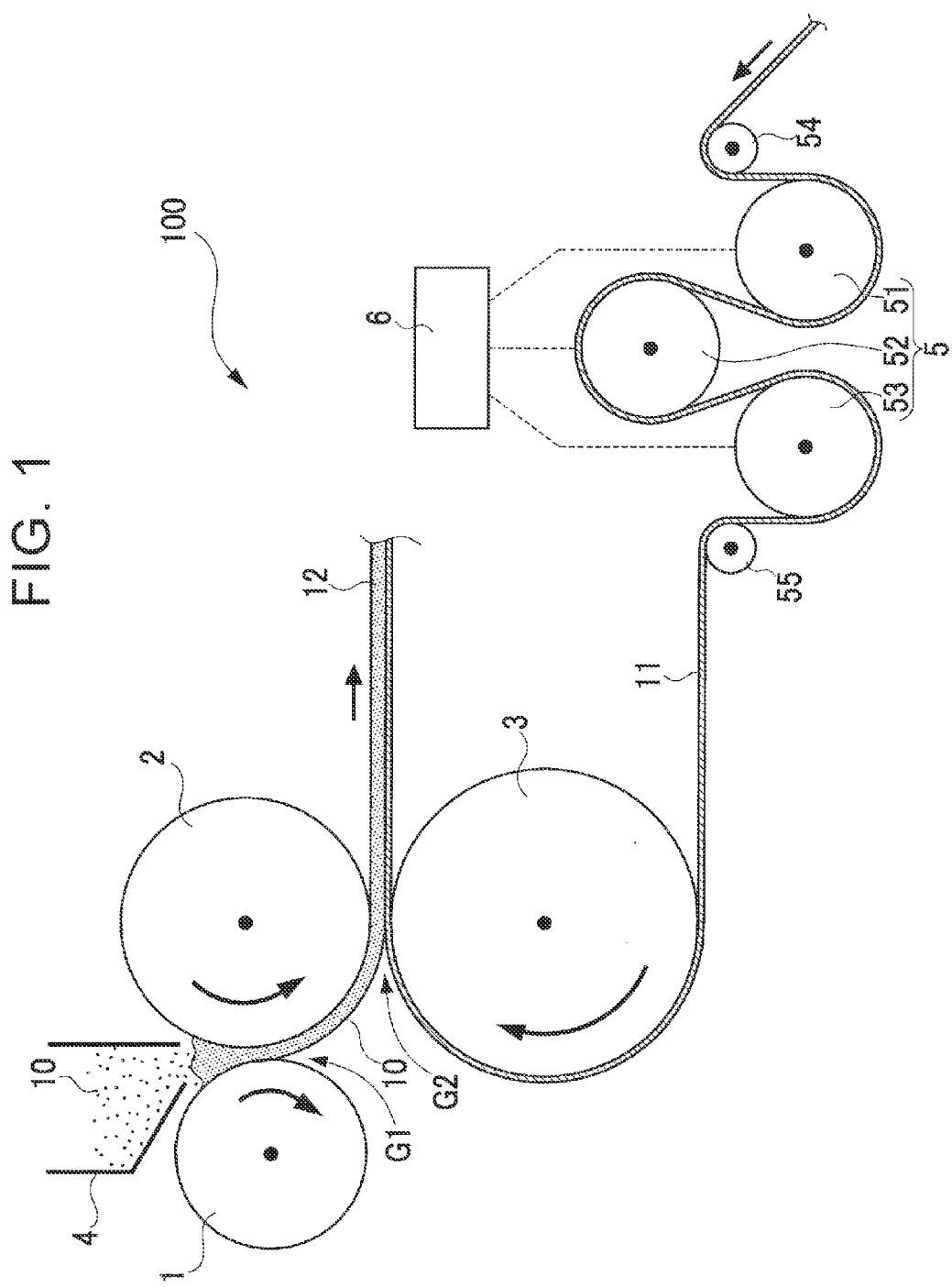
FIG. 1 is a schematic configuration diagram illustrating a manufacturing apparatus of a first embodiment.

A schematic configuration of a manufacturing apparatus 100 of the present embodiment is illustrated in FIG. 1. The manufacturing apparatus 100 of the present embodiment is an apparatus of manufacturing a belt-shaped electrode used for a lithium-ion secondary battery, for example. The manufacturing apparatus 100 is an apparatus of manufacturing a laminated sheet-shaped electrode 12 in which a layer of an active material is formed on a metal foil 11 by transferring granules 10 as an active-material material containing an active material to the metal foil 11 by use of a plurality of rolls.

Figure 2:
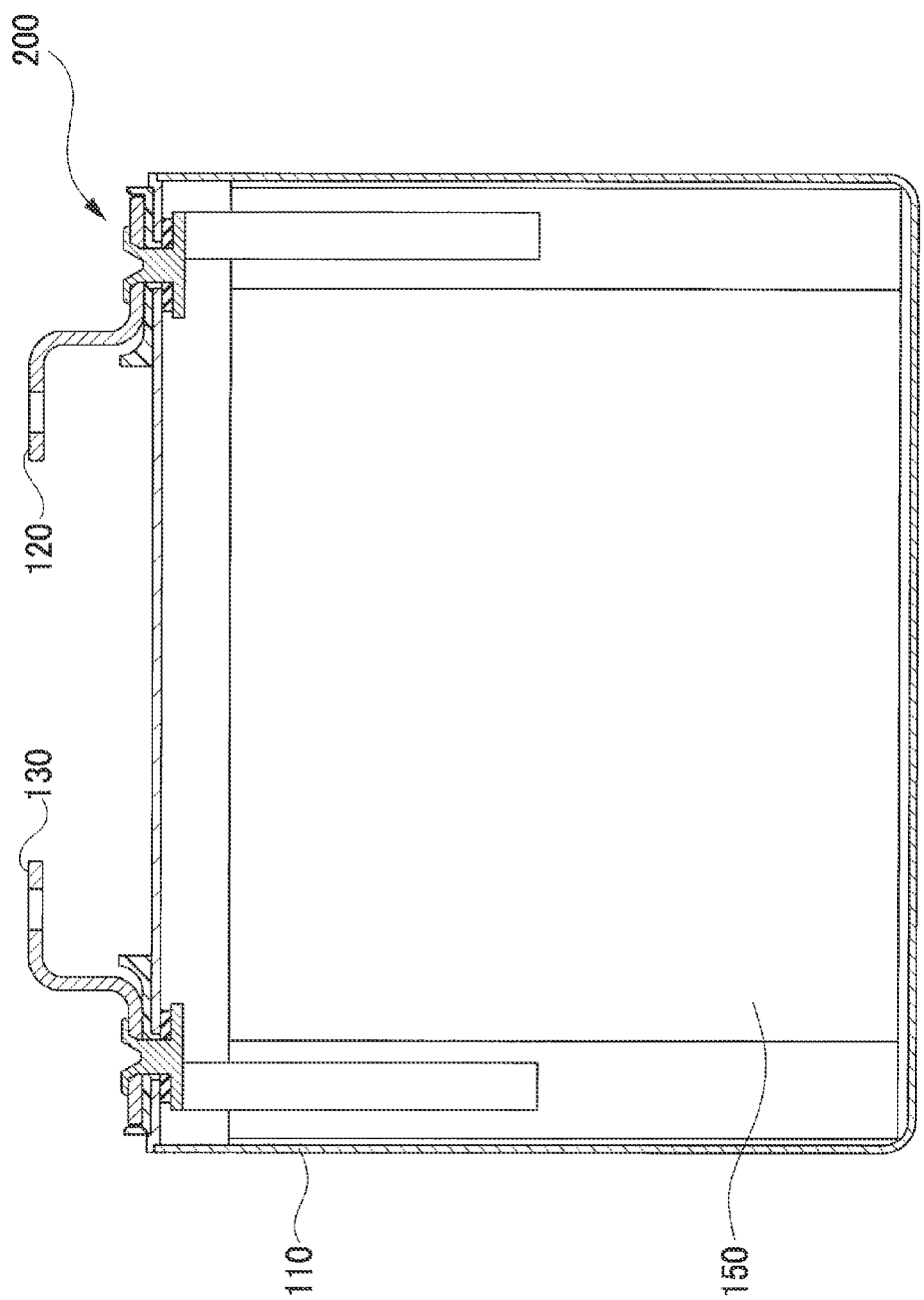
FIG. 2 is a schematic sectional view illustrating an example of a secondary battery.

The electrode 12 manufactured by the manufacturing apparatus 100 of the present embodiment is used for an encapsulated-type lithium-ion secondary battery 200 having a generally rectangular solid shape as illustrated in FIG. 2, for example. The lithium-ion secondary battery 200 is configured such that a wound electrode body 150 and an electrolytic solution are enclosed in a metal battery outer case 110.

The electrode body 150 is a wound body configured such that a belt-shaped positive electrode and a belt-shaped negative electrode are wound in a flat shape with a belt-shaped separator being sandwiched therebetween. The positive electrode is configured, for example, such that an active material layer including a positive active material is formed on an aluminum foil. The active material layer of the positive electrode includes an active material that can store and release lithium ions and is preferably formed such that a binder, a dispersion solvent, and the like are kneaded with a lithium-containing metal oxide, for example. The negative electrode is configured, for example, such that an active material layer including a negative active material is formed on a copper foil. As the negative active material layer, a carbon material such as graphite is preferable.

The lithium-ion secondary battery 200 includes a positive terminal 120 and a negative terminal 130 above the battery outer case 110 in FIG. 2. The positive terminal 120 and the negative terminal 130 are connected to positive and negative electrodes of the electrode body 150, respectively, inside the battery outer case 110.

Returning to the description of FIG. 1, the manufacturing apparatus 100 of the present embodiment includes an A-roll 1, a B-roll 2, a C-roll 3, a supply portion 4, and a cooling portion 5. The B-roll 2 is an example of a first roll, and the C-roll 3 is an example of a second roll. The cooling portion 5 is an example of a cooling device.

The A-roll 1, the B-roll 2, and the C-roll 3 are placed in parallel so as to face each other so that their rotating shafts are placed generally horizontally. In an example of FIG. 1, the A-roll 1 and the B-roll 2 are placed so as to be arranged side by side generally horizontally, and the C-roll 3 is placed below the B-roll 2. However, the arrangement of the rolls is not limited to the example in the figure. For example, all the three rolls 1, 2, 3 may be placed so as to be horizontally arranged side by side.

In terms of diameters of the rolls, the A-roll 1 has a smallest diameter among the three rolls, and the C-roll 3 has a largest diameter among the three rolls. Further, the A-roll 1 and the B-roll 2 are adjacent to each other with a gap of 60 to 100 µm, for example, at a nearest-neighbor part between their outer surfaces. Further, the B-roll 2 and the C-roll 3 are adjacent to each other with a gap of 10 to 20 µm, for example, at a nearest-neighbor part between their outer surfaces. The A-roll 1 and the C-roll 3 are not adjacent to each other. In the following description, the gap between the A-roll 1 and the B-roll 2 is referred to as a supply gap G1, and the gap between the B-roll 2 and the C-roll 3 is referred to as a deposition gap G2.

The A-roll 1, the B-roll 2, and the C-roll 3 are connected to respective motors for rotationally driving them, and are rotated at predetermined rotation speeds at the time of manufacture of an electrode. Note that a common motor may be provided for the rolls or individual motors may be provided for the rolls. Rotation directions of respective rolls are determined so that two rolls forming a gap move in the same direction at the supply gap G1 or the deposition gap G2 where the two rolls are adjacent to each other. That is, the A-roll 1 and the C-roll 3 are rotated in the same rotation direction, and the B-roll 2 is rotated in a rotation direction reverse to the A-roll 1 and the C-roll 3.

More specifically, in the example illustrated in FIG. 1, in the supply gap G1, outer peripheral surfaces of the A-roll 1 and the B-roll 2 move downward in FIG. 1, and in the deposition gap G2, outer peripheral surfaces of the B-roll 2 and the C-roll 3 move rightward in FIG. 1. Note that, in terms of circumferential speeds of the rolls at the time of the manufacture, the circumferential speed of the A-roll 1 is slowest among the three rolls, and the circumferential speed of the C-roll 3 is fastest among the three rolls. The diameters and the circumferential speeds of the rolls should be selected within a range where appropriate transfer is achievable in the deposition gap G2.

The supply portion 4 supplies granules 10 between the A-roll 1 and the B-roll 2. At the time of manufacturing an electrode by the manufacturing apparatus 100, the granules 10 are supplied from the supply portion 4 to the supply gap G1, as illustrated in FIG. 1. The granules 10 thus supplied from the supply portion 4 are sandwiched between the A-roll 1 and the B-roll 2 in the supply gap G1, so as to be molded in a film shape. The granules 10 thus formed in the film shape are attached to the outer peripheral surface of the B-roll 2 and are conveyed to the deposition gap G2.

The granules 10 are formed such that a small amount of solvent such as water is added to a pulverulent body containing an electrode active material and a binder so as to form a wet state and its resultant is granulated into a generally spherical shape by stirring. The pulverulent body may further contain a thickening agent. Further, the granules 10 to be used herein may be granules having generally the same grain size by sieving or the like, for example. In comparison with a pasty material of the related art, the granules 10 contain little water, so that a time required for drying is shortened by use of the granules 10.

At the time of manufacturing an electrode by use of the manufacturing apparatus 100, a metal foil 11 is supplied to the deposition gap G2 by the C-roll 3, as illustrated in FIG. 1. The metal foil 11 is a thin belt-shaped metal film having a thickness of 10 to 20 µm, for example, and an aluminum foil is used for the manufacture of a positive electrode, while a copper foil is used for the manufacture of a negative electrode. The metal foil 11 is let out from a supply roll (not shown) or the like, and is conveyed to the deposition gap G2 by the outer peripheral surface of the C-roll 3.

In the deposition gap G2, the granules 10 attached to the outer peripheral surface of the B-roll 2 is opposed to the metal foil 11 conveyed on the outer peripheral surface of the C-roll 3. A magnitude of a narrowest part in the deposition gap G2 is smaller than a total thickness of a thickness of the granules 10 on the B-roll 2 and a thickness of the metal foil 11. Accordingly, in the deposition gap G2, the granules 10 are pressed against the metal foil 11. Further, since the circumferential speed of the C-roll 3 is faster than the circumferential speed of the B-roll 2, the granules 10 are transferred to the metal foil 11 so that an electrode 12 is formed in a laminated state. The electrode 12 thus manufactured is conveyed rightward in FIG. 1 from the C-roll 3, and is dried in a drying furnace (not shown) or the like.

The cooling portion 5 includes three cooling rolls 51, 52, 53 in combination as illustrated in FIG. 1, for example, so as to cool down the metal foil 11 making contact with outer surfaces of the cooling rolls 51, 52, 53. The cooling rolls 51 to 53 are metal rolls in each of which a passage for coolant is formed. Surfaces of the cooling rolls 51 to 53 are cooled down by the coolant flowing therethrough, so as to cool down the metal foil 11 wound around their surfaces. The cooling portion 5 is placed in the middle of a conveyance path of the metal foil 11, at a position on an upstream side relative to the C-roll 3 in terms of a conveying direction of the metal foil 11. After the metal foil 11 is cooled by the cooling portion 5 to a temperature within a predetermined range, the metal foil 11 is wound around the C-roll 3 on the upstream side relative to the deposition gap G2.

As illustrated in FIG. 1, the cooling rolls 51 to 53 are placed in parallel to each other at regular intervals. It is desirable that respective axial lengths of the cooling rolls 51 to 53 be larger than a length of the metal foil 11 in a direction perpendicular to its conveying direction. Further, it is desirable that outside diameters of the cooling rolls 51 to 53 be large to such an extent that the metal foil 11 can be wound therearound, and rolls having an outside diameter that is not less than 50 mm but not more than an outside diameter of the C-roll 3 are suitable. Suitable contact angles of the metal foil 11 to the cooling rolls 51 to 53 are 90 degrees to 270 degrees, for example. The contact angles are angles of ranges where outer peripheries of the cooling rolls 51 to 53 make contact with the metal foil 11. When the contact angles are too small, coolability becomes small, and when the contact angles are too large, it is difficult to control the conveyance.

Further, the cooling portion 5 of the present embodiment includes auxiliary rolls 54, 55 before and behind the cooling rolls 51 to 53. The auxiliary rolls 54, 55 secure the contact angles between the metal foil 11 and the cooling rolls 51 to 53 and fix the conveyance path of the metal foil 11 so that the metal foil 11 is wound around the C-roll 3 with an appropriate tension. Note that the cooling rolls 51 to 53 and the auxiliary rolls 54, 55 are all attached rotatably so as to rotate along with a movement of the metal foil 11.

The manufacturing apparatus 100 of the present embodiment includes a chiller 6 having a pumping function to circulate the coolant through the cooling rolls 51 to 53 of the cooling portion 5, and a heat exchange function to maintain a temperature of the coolant to be supplied. The chiller 6 is an example of a refrigerant supply portion. The chiller 6 performs heat-exchange between the coolant passing through the cooling rolls 51 to 53 and cooling refrigerant provided inside the chiller 6, and sends out the coolant maintained at a preset temperature to the cooling rolls 51 to 53. A temperature of the metal foil 11 after the cooling varies depending on a temperature of the metal foil 11 before the cooling, contact areas between the cooling rolls 51 to 53 and the metal foil 11, and the preset temperature of the chiller 6. The preset temperature is a temperature for keeping the temperature of the metal foil 11 after the cooling within a predetermined range. The preset temperature will be described later in detail.

Note that a passage for the coolant in each of the cooling rolls 51 to 53 may be a linear passage parallel to an axial direction of the each of the cooling rolls or may be a spiral passage around the axial direction of the each of the cooling rolls. Further, a plurality of passages may be provided or a single passage may be provided. Further, all the cooling rolls 51 to 53 may be rolls of the same type or may include a roll of a different type. Further, instead of the coolant, other liquids or gaseous refrigerant may be used.

In the manufacturing apparatus 100 of the present embodiment, the metal foil 11 is cooled down by the cooling portion 5 on the upstream side relative to the C-roll 3 in the conveying direction, namely, before the metal foil 11 is supplied to the C-roll 3. The metal foil 11 thus cooled down reaches the deposition gap G2. In the deposition gap G2, the granules 10 are pressed against the metal foil 11, and heat is generated by friction between granular materials in the granules 10, for example. Since the metal foil 11 is cooled down, the temperature of the metal foil 11 is lower than a surface temperature of the B-roll 2, so that the heat thus generated is mainly transmitted to the metal foil 11 in the deposition gap G2. Accordingly, the temperatures of the B-roll 2 and the C-roll 3 are less likely to increase. That is, even in a case where an electrode is manufactured continuously by use of a long metal foil 11, the heat is less likely to accumulate in the B-roll 2 and the C-roll 3, and an increase in the diameters of the B-roll 2 and the C-roll 3 is restrained. Accordingly, the magnitude of the deposition gap G2 is less likely to become small, thereby increasing a possibility that the thickness of the active material layer of the manufactured electrode 12 can be maintained within an appropriate range.

In the present embodiment, since the cooling portion 5 is provided additionally so as to cool down the metal foil 11, it is not necessary to perform machining on the B-roll 2 and the C-roll 3. The B-roll 2 and the C-roll 3 are rolls on which a high-precision surface treatment is performed, and it is not easy to perform machining for direct cooling, such as providing of a passage for coolant in the B-roll 2 and the C-roll 3. With the present embodiment, it is possible to restrain heat accumulation to the B-roll 2 and the C-roll 3 while maintaining the precision of the B-roll 2 and the C-roll 3.

Next will be described the control of the preset temperature of the chiller 6 in the manufacturing apparatus 100. By the control of the preset temperature of the chiller 6, the manufacturing apparatus 100 of the present embodiment controls the temperature of the coolant circulating through the passages of the cooling rolls 51 to 53, so as to adjust the temperature of the metal foil 11 that has passed through the cooling portion 5. An exemplary electrical configuration for the control of the preset temperature of the chiller 6 in the manufacturing apparatus 100 is illustrated in a block diagram of FIG. 3.

Figures 3, 4:
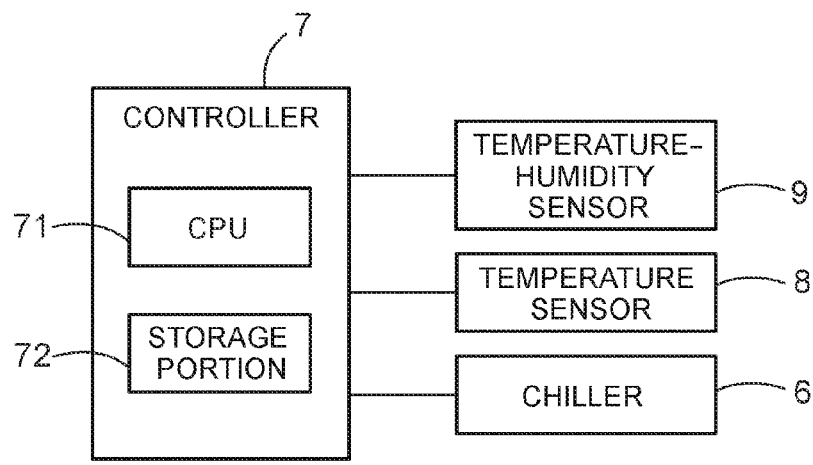
FIG. 3 is a block diagram illustrating an electrical configuration of the manufacturing apparatus.
FIG. 4 is an explanatory view illustrating an exemplary dew point temperature table.

As illustrated in FIG. 3, the manufacturing apparatus 100 includes a controller 7. The controller 7 includes a CPU 71 and a storage portion 72. Further, a temperature-humidity sensor 9 for acquiring an air temperature and a relative humidity of a manufacture environment, a temperature sensor 8 for acquiring the temperature of the metal foil 11 after the cooling, and the chiller 6 are electrically connected to the controller 7.

The temperature-humidity sensor 9 is a temperature-humidity meter, for example, and outputs a signal that varies depending on the air temperature and the relative humidity around a let-off roll of the metal foil 11. The temperature sensor 8 outputs a signal that varies depending on the temperature of the metal foil 11 at a position on a downstream side relative to the cooling portion 5 but on the upstream side relative to the C-roll 3 in terms of the conveying direction of the metal foil 11. The temperature sensor 8 is, for example, a thermistor, and is desirably a noncontact type.

As illustrated in FIG. 4, for example, the storage portion 72 of the controller 7 stores a dew point temperature table 73 indicative of a dew point temperature corresponding to an air temperature and a relative humidity of the manufacture environment. Note that the dew point temperature table 73 exemplified in FIG. 4 shows some dew point temperatures, and it is desirable to store a table in which dew point temperatures are broken down more minutely over wider temperature and humidity ranges.

Then, the CPU 71 refers to the dew point temperature table 73 based on the output signal of the temperature-humidity sensor 9 and the output signal of the temperature sensor 8, and controls the preset temperature of the chiller 6 so that the temperature of the metal foil 11 after the cooling falls within a predetermined range. More specifically, the CPU 71 controls the preset temperature of the chiller 6 so that the temperature of the metal foil 11 after the cooling is as low as possible within a range that is higher than the dew point temperature but lower than the air temperature of the manufacture environment.

For this purpose, the CPU 71 acquires an air temperature and a relative humidity of the manufacture environment based on the output signal of the temperature-humidity sensor 9. Then, the CPU 71 refers to the dew point temperature table 73 and acquires a dew point temperature corresponding to the air temperature and the relative humidity thus acquired. After that, the preset temperature of the chiller 6 is set to a temperature obtained by adding a predetermined margin width to the dew point temperature thus acquired. The margin width is a value larger than 0, and may be a fixed value or may be a variable value varying depending on the air temperature.

When the temperature of the metal foil 11 after the cooling is equal to or higher than the air temperature of the manufacture environment, a heat transfer effect in the deposition gap G2 becomes small. In the present embodiment, the CPU 71 sets the preset temperature of the chiller 6 so that the temperature of the metal foil 11 after the cooling is lower than the air temperature of the manufacture environment, and thus, the heat transfer effect in the deposition gap G2 is large. Further, when the metal foil 11 is equal to or lower than the dew point temperature, water drops may be attached to the metal foil 11, which may decrease a transfer property in the deposition gap G2. Further, when water drops are attached to the C-roll 3 from the metal foil 11, rust may be caused in the C-roll 3 or its peripheral driving portion or the like. In the present embodiment, the CPU 71 sets the preset temperature of the chiller 6 so as to prevent the metal foil 11 from reaching the dew point temperature or lower, so that the adherence of water drops to the metal foil 11 is restrained.

Figure 5:
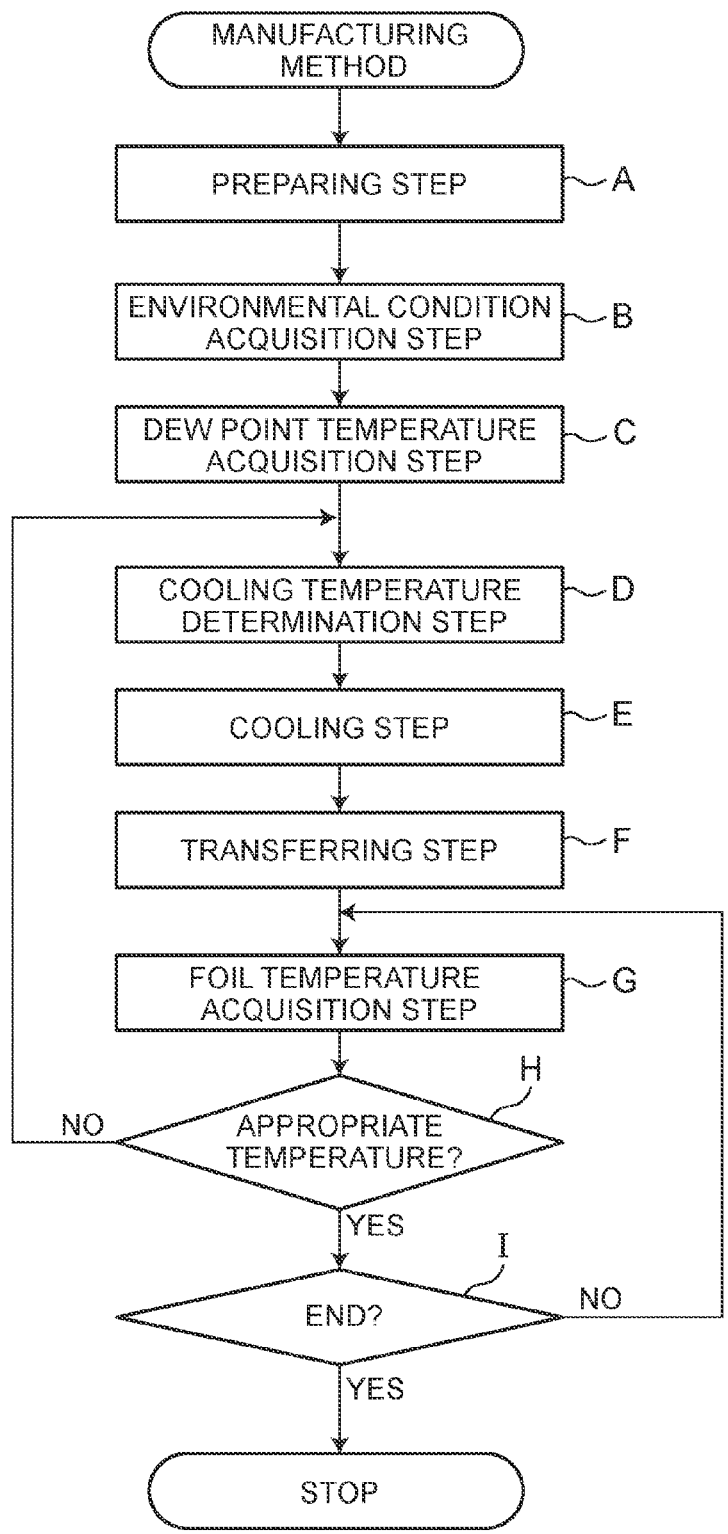
FIG. 5 is a process drawing illustrating a manufacturing method by the manufacturing apparatus.

Next will be described a manufacturing method of manufacturing an electrode by use of the manufacturing apparatus 100 of the present embodiment. As illustrated in FIG. 5, the manufacturing method of the present embodiment includes the following steps A to F: a preparing step A of preparing the granules 10 and the metal foil 11; an environmental condition acquisition step B of acquiring an air temperature and a relative humidity of the environment; a dew point temperature acquisition step C of acquiring a dew point temperature based on the air temperature and the relative humidity; a cooling temperature determination step D of determining a preset temperature of the chiller 6 based on the dew point temperature; a cooling step E of driving the chiller 6 to supply the coolant to the cooling rolls 51 to 53; and a transferring step F of transferring the granules 10 to the metal foil 11.

In the preparing step A, the granules 10 and the metal foil 11 are prepared. As illustrated in FIG. 1, the metal foil 11 is wound so as to make contact with the surfaces of the cooling rolls 51 to 53. In FIG. 1, two auxiliary rolls 54, 55 are used to increase contact lengths of the metal foil 11 with respect to the cooling rolls 51 to 53 in terms of the conveying direction.

In the environmental condition acquisition step B, the CPU 71 acquires an air temperature and a relative humidity of the manufacture environment based on the output signal of the temperature-humidity sensor 9.

In the dew point temperature acquisition step C, the CPU 71 refers to the dew point temperature table 73 stored in the storage portion 72, and acquires a dew point temperature based on the air temperature and the relative humidity acquired in the environmental condition acquisition step B. Note that the environmental condition acquisition step B and the dew point temperature acquisition step C may be performed before the preparing step A. Further, the environmental condition acquisition step B and the dew point temperature acquisition step C may be performed once before the start of a series of the manufacturing process, or may be performed repeatedly every predetermined time.

In the cooling temperature determination step D, the preset temperature of the chiller 6 is determined to a temperature obtained by adding a margin width to the dew point temperature acquired in the dew point temperature acquisition step C. In the present embodiment, the preset temperature is set to be higher than the dew point temperature by 0.5° C. Since the margin width is provided, it is possible to cool down the cooling rolls 51 to 53 while preventing the temperature of the metal foil 11 after the cooling from decreasing to the dew point temperature or lower, even if the temperature reaches its lowest temperature within a range of the temperature control performance of the chiller 6.

In the cooling step E, the chiller 6 is driven to supply the coolant to the cooling rolls 51 to 53, so as to cool down the surfaces of the cooling rolls 51 to 53 and the metal foil 11 wound therearound. Note that the timing to start the cooling may be before the start of the transferring step F, at the same time as the start of the transferring step, or after a predetermined time has elapsed from the start of the transferring step. Alternatively, the timing may be after the transferring step is started and the temperature of the B-roll 2 or the temperature of the C-roll 3 reaches a predetermined limiting temperature.

In the transferring step F, the A-roll 1, the B-roll 2, and the C-roll 3 are rotationally driven at respective predetermined rotation speeds, and the granules 10 are supplied from the supply portion 4 to the supply gap G1. The granules 10 thus supplied to the supply gap G1 are conveyed to the deposition gap G2 by the B-roll 2 and then transferred to the metal foil 11 in the deposition gap G2. Thus, the electrode 12 is manufactured. As described earlier, after the cooling step E is started, the cooling step E and the transferring step F are performed at the same time.

Further, in the manufacturing method of the present embodiment, after the start of the transferring step, the CPU 71 monitors the temperature of the metal foil 11 and performs feedback control, as illustrated in FIG. 5. More specifically, the CPU 71 acquires the temperature of the metal foil 11 based on the output signal of the temperature sensor 8 in a foil temperature acquisition step G. Further, in a determination step H, the CPU 71 determines whether or not the temperature acquired in the foil temperature acquisition step G is within an appropriate temperature range with respect to the air temperature acquired in the environmental condition acquisition step B and the dew point temperature acquired in the dew point temperature acquisition step C. Note that, in a case where the environmental condition acquisition step B and the dew point temperature acquisition step C are performed repeatedly, the determination step H should be performed based on an air temperature and a dew point temperature newly acquired.

When it is determined that the temperature is not within the appropriate temperature range, the CPU 71 returns to the cooling temperature determination step D and changes the preset temperature of the chiller 6. For example, when it is determined that the temperature of the metal foil 11 is too high relative to the dew point temperature, the CPU 71 changes the preset temperature of the chiller 6 to a lower temperature. For example, the preset temperature of the chiller 6 is set to a temperature equal to the dew point temperature. Further, when it is determined that the temperature of the metal foil 11 is too close to the dew point temperature, the CPU 71 changes the preset temperature of the chiller 6 to a higher temperature. For example, the preset temperature of the chiller 6 is set to be higher than the dew point temperature by 1.0° C.

In the meantime, when it is determined that the temperature is within the appropriate temperature range, the CPU 71 determines whether or not the manufacturing process is finished (an end determination step I). When the manufacturing process is not finished, the temperature of the metal foil 11 is acquired appropriately to perform a feedback control, and the manufacture is continued. When it is determined to finish the manufacturing process, the rotational driving of the B-roll 2 and the C-roll 3 and the driving of the chiller 6 are stopped.

Figure 6:
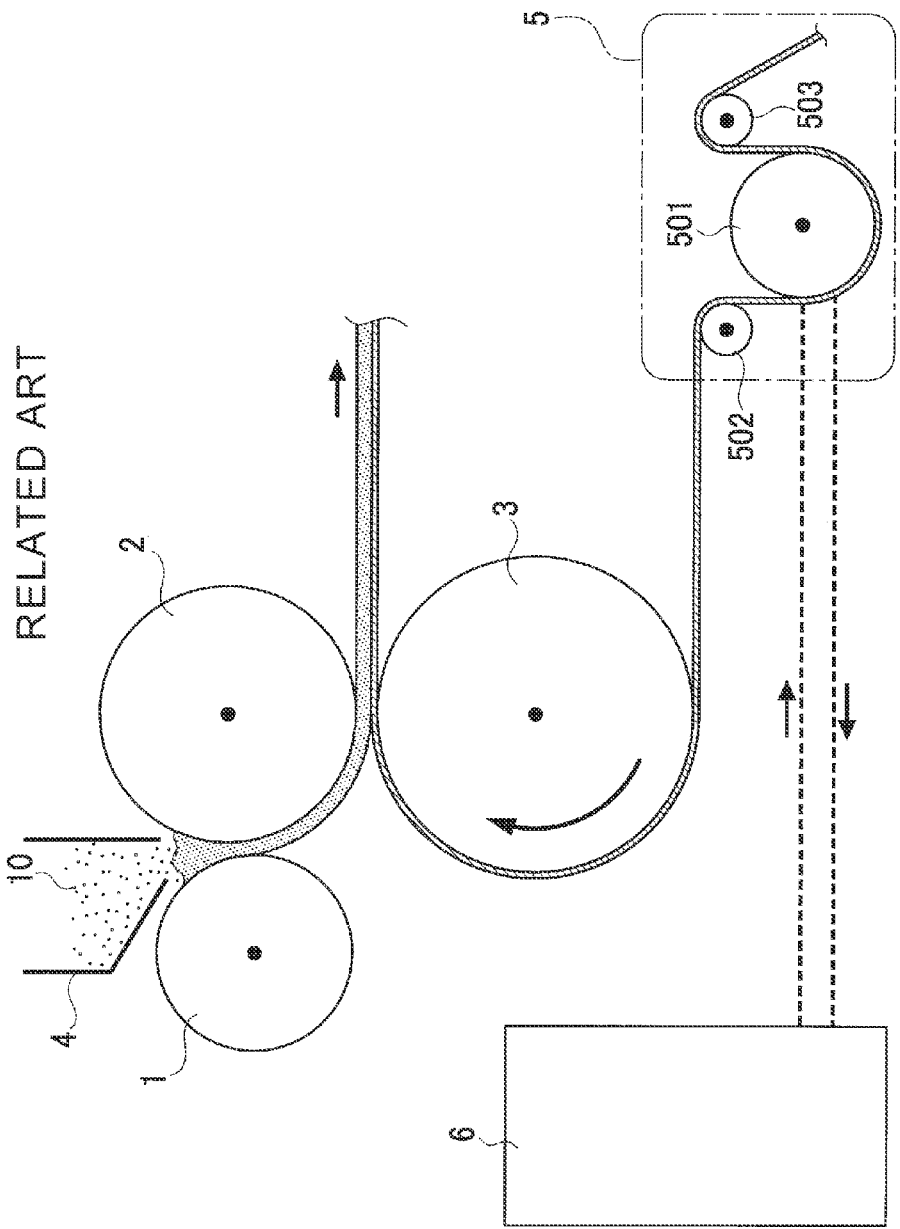
FIG. 6 is a schematic configuration diagram illustrating a manufacturing apparatus that performs an electrode manufacturing experiment.

Next will be described a result of an experiment performed by the inventor in terms of the manufacturing method of the present embodiment. The inventor manufactured an electrode by use of the manufacturing apparatus 100 of the present embodiment and compared the electrode with a manufacture result by an apparatus of the related art that does not include the cooling portion 5. The manufacturing apparatus 100 used for the experiment includes, as the cooling portion 5, one cooling roll 501 and two auxiliary rolls 502, 503 on both sides of the cooling roll, as illustrated in FIG. 6. Due to the two auxiliary rolls 502, 503, a contact range between the cooling roll 501 and the metal foil 11 is secured.

In this experiment, a positive electrode was manufactured by use of positive granules with a solid content of 78% as the granules 10, and an aluminum foil with a thickness of 12 μm as the metal foil 11. Further, a commercial cooling roll with an outside diameter of 50 mm was used as the cooling roll 501, and placed so that a contact angle was approximately 180 degrees. Further, a commercial desktop small-size low temperature thermobath was used as the chiller 6.

The manufacture environment under which the experiment was performed was such that an air temperature was approximately 23±2° C. and a relative humidity was approximately 50±10%. Under this environmental condition, a dew point temperature was within approximately 6.9 to 16.7° C. In view of this, a preset temperature of the chiller 6 was set to 17.5±0.5° C.

Figure 7:
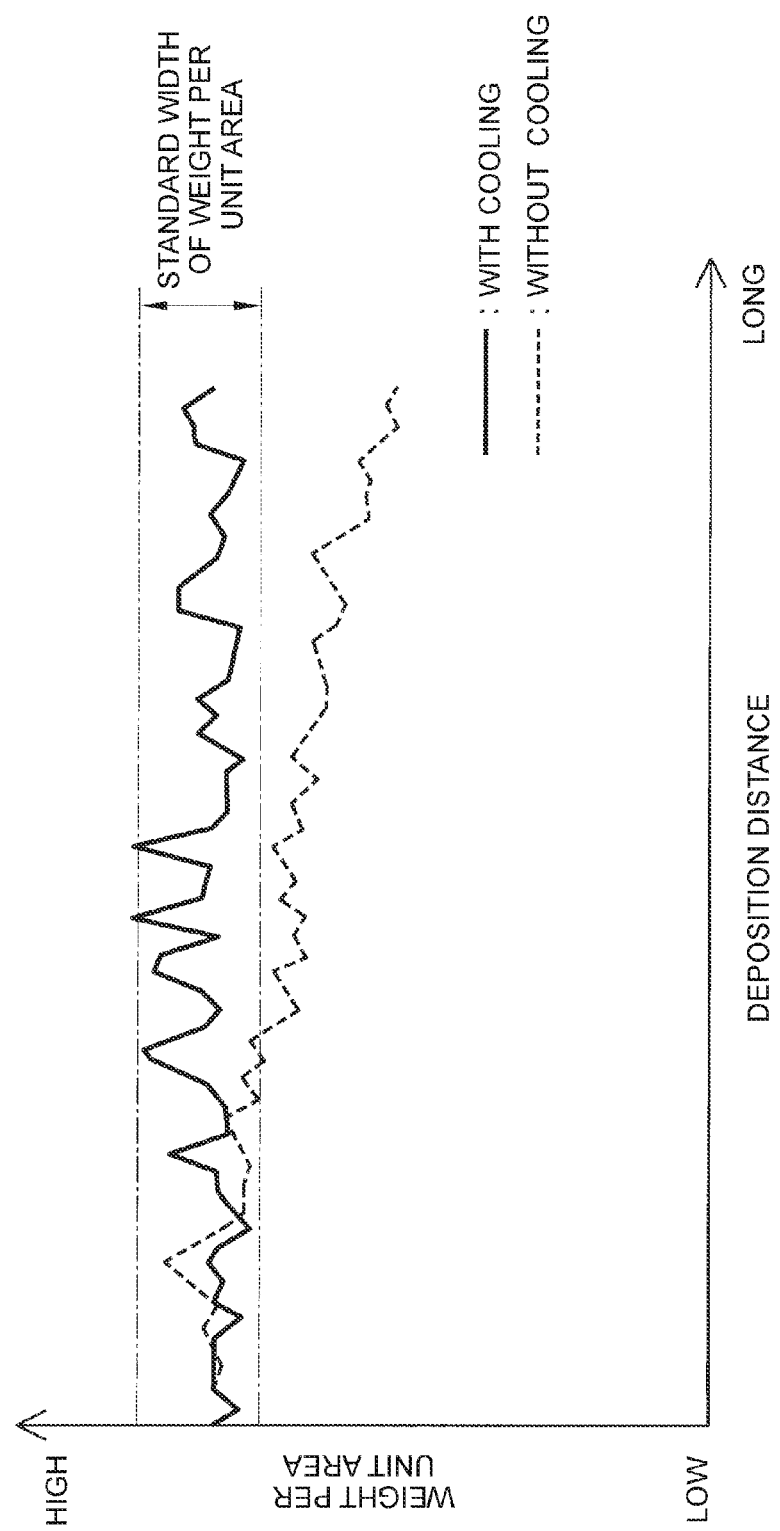
FIG. 7 is a graph illustrating a result of the electrode manufacturing experiment.

In this experiment, the manufacture of the electrode 12 was performed continuously around ten minutes such that the above granules 10 were supplied while the metal foil 11 was conveyed at a conveyance speed of 30 to 60 m/min. A change of a weight per unit area of a layer of the granules 10 in the electrode 12 thus manufactured is illustrated in FIG. 7. In the graph of FIG. 7, the vertical axis indicates a magnitude of the weight per unit area, and the horizontal axis indicates a length of the electrode 12 manufactured continuously. Further, a result of the manufacture by the manufacturing apparatus 100 of the present embodiment which is provided with the cooling portion 5 is indicated by a continuous line, and a result by the manufacturing apparatus that is not provided with the cooling portion 5 is indicated by a broken line. Note that the weight per unit area is a weight of the granules 10 in a unit area of the electrode 12 after the manufacture. In the experiment, the weight per unit area was calculated such that a part with a predetermined area was cut out from the electrode 12 thus manufactured, the granules 10 were removed from the metal foil 11, and a weight thereof was measured.

As indicated by the continuous line in FIG. 7, the weight per unit area of the electrode 12 manufactured by the manufacturing apparatus 100 of the present embodiment was within its standard range even if the electrode 12 was manufactured continuously for a long period of time. The standard range of the weight per unit area is a range indicated by an alternate long and short dash line in FIG. 7. That is, it was found that, by cooling down the metal foil 11, the weight per unit area was not reduced even if the electrode was manufactured continuously, and the thickness and the weight per unit area of the granules 10 could be maintained within an appropriate range. In the meantime, as indicated by the broken line in FIG. 7, in a case of the apparatus of the related art which is not provided with the cooling portion 5, its weight per unit area was gradually decreased as the electrode was manufactured continuously.

As specifically described above, with the manufacturing method of the electrode of the first embodiment, the metal foil 11 is cooled down by the cooling portion 5 at a position on the upstream side relative to the C-roll 3, and reaches the deposition gap G2 in a cooled state. Accordingly, processing heat generated in the deposition gap G2 is easily removed by the metal foil 11, so that the increase in the temperature is restrained both in the B-roll 2 and the C-roll 3. Accordingly, even when the electrode is manufactured continuously for a long period of time, the deposition gap G2 is less likely to become small, thereby increasing a possibility that the thickness and the weight per unit area of the granules 10 in the electrode 12 thus manufactured can be maintained within an appropriate range.

Next will be described a second embodiment that embodies the present disclosure in detail with reference to the attached drawings. The present embodiment is obtained such that the present disclosure is applied to a manufacturing apparatus used in a process of manufacturing a belt-shaped electrode, similarly to the first embodiment. A constituent or a step similar to that of the first embodiment has the same reference sign as that of the first embodiment, and a description thereof is omitted.

Figure 8:
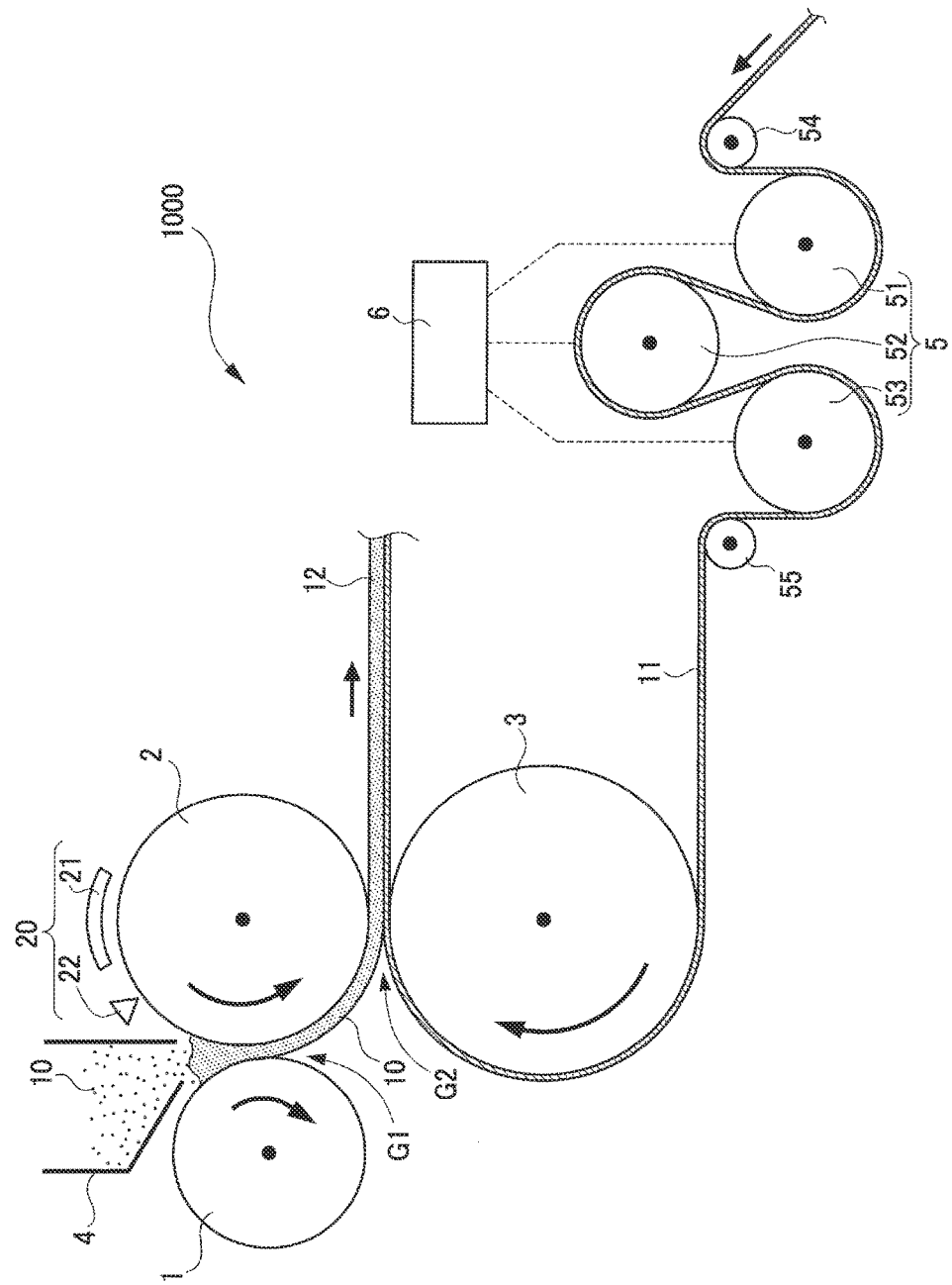
FIG. 8 is a schematic configuration diagram illustrating a manufacturing apparatus of a second embodiment.

A schematic configuration of a manufacturing apparatus 1000 of the second embodiment is illustrated in FIG. 8. Similarly to the first embodiment, the manufacturing apparatus 1000 of the present embodiment is an apparatus of manufacturing a belt-shaped electrode used for a lithium-ion secondary battery, for example. The manufacturing apparatus 1000 is an apparatus of manufacturing a laminated sheet-shaped electrode 12 in which a layer of an active material is formed on a metal foil 11 by transferring granules 10 as an active-material material containing an active material to the metal foil 11 by use of a plurality of rolls.

The manufacturing apparatus 1000 of the present embodiment includes an A-roll 1, a B-roll 2, a C-roll 3, a supply portion 4, a cooling portion 5, a chiller 6 for cooling down the cooling rolls 51 to 53 of the cooling portion 5, and a heating portion 20. The heating portion 20 includes a heater 21 and a temperature sensor 22. Members other than the heating portion 20 are similar to those in the first embodiment.

The heater 21 is a nichrome wire electric-heater, for example, and heats at least a whole outer peripheral surface of the B-roll 2 in terms of a rotation-axis direction as uniformly as possible. As illustrated in FIG. 8, the heater 21 is provided on an outer peripheral side of the B-roll 2, at a position where the heater 21 does not make contact with the B-roll 2. Note that the heater 21 may be an electric-heater such as a halogen heater or a ceramic heater, except for the nichrome wire electric-heater, or may be an induction-heating type heating member including a coil. Further, a hollow may be provided on an inner peripheral side of the B-roll 2 so that the heater 21 is placed therein.

The temperature sensor 22 is a thermistor, for example, and outputs a signal that varies depending on a temperature of the outer peripheral surface of the B-roll 2. The temperature sensor 22 may directly measure a surface temperature of the B-roll 2 or may measure a temperature of a given spot, such as a temperature of a rotating shaft of the B-roll 2, so that the surface temperature of the B-roll 2 can be estimated from a result of the measurement. Further, a single temperature sensor 22 may be provided, or a plurality of temperature sensors 22 may be provided.

Figure 9:
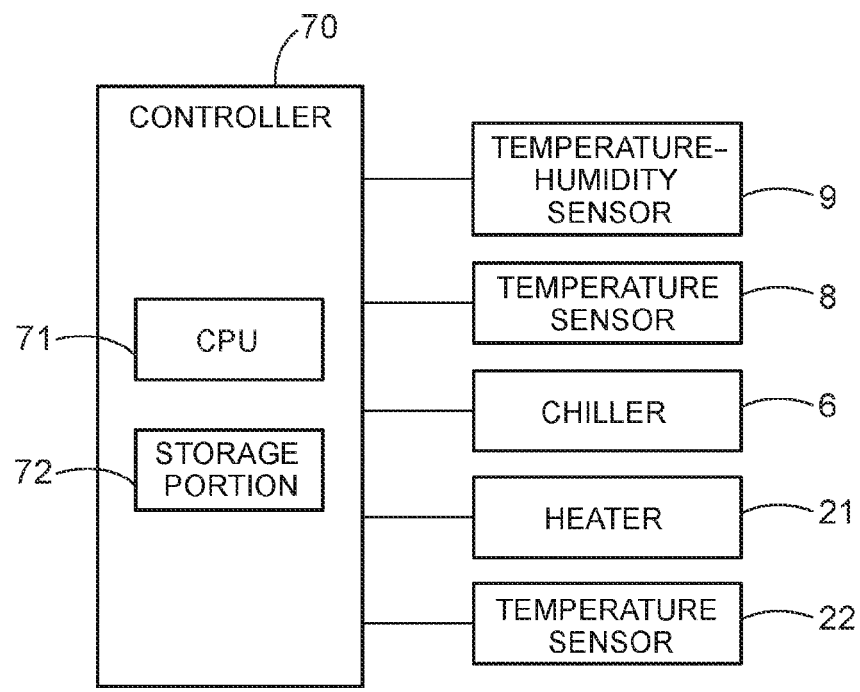
FIG. 9 is a block diagram illustrating an electrical configuration of the manufacturing apparatus of the second embodiment.

An exemplary electrical configuration of the manufacturing apparatus 1000 of the present embodiment is illustrated in FIG. 9. The manufacturing apparatus 1000 includes a controller 70 for controlling a temperature of each part. A temperature-humidity sensor 9, a temperature sensor 8, the chiller 6, the heater 21, and the temperature sensor 22 are electrically connected to the controller 70. The temperature-humidity sensor 9, the temperature sensor 8, and the chiller 6 are similar to those in the first embodiment. The controller 70 performs a temperature control of the cooling portion 5 and a temperature control of the heating portion 20.

Similarly to the first embodiment, the controller 70 determines a preset temperature of the chiller 6 based on an output signal of the temperature-humidity sensor 9 and an output signal of the temperature sensor 8. The controller 70 further determines a target temperature of the heating portion 20 based on the determined preset temperature of the chiller 6. The controller 70 determines a target temperature of the heating portion 20 so that a surface temperature of the B-roll 2 becomes a temperature higher, by a predetermined temperature or more, than a temperature of the metal foil 11 cooled down by the cooling portion 5. More specifically, the controller 70 determines a target temperature of the surface of the B-roll 2 so that its temperature difference from a preset temperature of the metal foil 11 falls within a range of not less than 10° C. but less than 25° C. The temperature difference is further preferably within a range of not less than 15° C. but less than 20° C.

Further, the controller 70 controls the heater 21 based on an output signal of the temperature sensor 22. The controller 70 controls the surface temperature of the B-roll 2 so as to fall within a predetermined temperature range with respect to the target temperature thus determined. The predetermined temperature range is set to a temperature of ±1° C. from the target temperature, for example. That is, for example, when the surface temperature of the B-roll 2 reaches a high limit of the predetermined temperature range or more, the controller 70 turns off the heater 21, and when the surface temperature of the B-roll 2 reaches a lower limit of the predetermined temperature range or less, the controller 70 turns on the heater 21.

In the present embodiment, granules 10 are conveyed toward a deposition gap G2 by the B-roll 2 that is heated. The granules 10 are sandwiched and compressed between the metal foil 11 and the B-roll 2 in the deposition gap G2 between the B-roll 2 and the C-roll 3. Hereby, heat is generated by friction between granular materials in the granules 10, for example.

The heat thus generated in the granules 10 is transmitted to peripheral members from the deposition gap G2. Since the B-roll 2 is heated in advance, its temperature is higher than at least the granules 10 that have not reached the deposition gap G2. Meanwhile, the metal foil 11 is cooled down, so that its temperature is lower than the granules 10. On this account, the heat generated in the granules 10 mostly moves to the metal foil 11 having a lower temperature, so that an amount of heat to move to the B-roll 2 is further smaller than the first embodiment.

Further, the heating portion 20 that heats the B-roll 2 is controlled by the controller 70. When the surface temperature of the B-roll 2 increases to be excessively higher than the target temperature, the heater 21 is turned off by the controller 70, so that the surface temperature of the B-roll 2 is more likely to reach the target temperature early.

Accordingly, heat accumulation to the B-roll 2 and expansion of the B-roll 2 because of the heat accumulation are further restrained as compared with the first embodiment. That is, even if the electrode is manufactured continuously by use of the long metal foil 11, diameters of the B-roll 2 and the C-roll 3 can hardly change. Accordingly, a magnitude of the deposition gap G2 is less likely to change after the start of the manufacture, thereby increasing a possibility that the thickness of the active material layer of the manufactured electrode 12 can be maintained within an appropriate range. Note that, in the present embodiment, the rolls 2, 3 should be placed so that the magnitude of the deposition gap G2 is a predetermined magnitude based on the diameter of the B-roll 2 after the heating to the target temperature.

Next will be described a manufacturing method of manufacturing an electrode by use of the manufacturing apparatus 1000 of the present embodiment. In the manufacturing method of the present embodiment, the controller 70 performs a manufacturing process including the following steps A, J, B, C, D, K, L, F as illustrated in FIG. 10. Note that the steps A, B, C, D, F are steps similar to those of the first embodiment. The steps are as follows: a preparing step A of preparing the granules 10 and the metal foil 11; a heating step J of heating the B-roll 2; an environmental condition acquisition step B of acquiring an air temperature and a relative humidity of an environment; a dew point temperature acquisition step C of acquiring a dew point temperature based on the air temperature and the relative humidity; a cooling temperature determination step D of determining a preset temperature of the chiller 6 based on the dew point temperature; a heating temperature determination step K of determining a target temperature of the B-roll 2; a cooling and heating step L of performing cooling by the cooling portion 5 and heating by the heating portion 20; and a transferring step F of transferring the granules 10 to the metal foil 11.

In the heating step J, the B-roll 2 is heated from a normal temperature state to a temporary target temperature set in advance. The temporary target temperature is 35° C., for example. In the present embodiment, the heating step J is performed before an environmental condition is acquired in the environmental condition acquisition step B, and after the temperature of the B-roll 2 becomes stable, an environmental temperature is acquired in the subsequent environmental condition acquisition step B. Note that the heating step J may be performed before the preparing step A.

In the heating temperature determination step K, the target temperature of the heating portion 20 is determined based on the preset temperature determined in the cooling temperature determination step D. As described above, the target temperature of the heating portion 20 should be a temperature higher than the preset temperature of the cooling portion 5 at least by 10° C. or more, further preferably by 15° C. or more.

In the cooling and heating step L, the metal foil 11 is cooled down as described in the cooling step E in the first embodiment, and the B-roll 2 is heated by the heating portion 20. After the B-roll 2 has reached the target temperature, the conveyance of the metal foil 11 is started in the transferring step F. Note that, in a case where the target temperature determined in the heating temperature determination step K is largely different from the temporary target temperature, the steps B to D may be performed again after the heating is started in the cooling and heating step L but before the start of the transferring step F.

Further, in the present embodiment, a feedback control is performed, similarly to the first embodiment. In a temperature acquisition step M, not only the temperature of the metal foil 11 but also the temperature of the B-roll 2 is acquired. Then, in a determination step H, it is determined whether the temperatures are within their appropriate temperature ranges or not, so as to adjust the temperature of the cooling portion 5 and the temperature of the heating portion 20. That is, the controller 70 controls the heater 21 so that the surface temperature of the B-roll 2 falls within a predetermined temperature range with respect to the target temperature. Further, the steps L to H are repeated until it is determined to finish the process in an end determination step I.

Next will be described a result of an experiment performed by the inventor in terms of the manufacturing method of the present embodiment. The inventor manufactured an electrode by the manufacturing apparatus 1000 of the present embodiment, and compared a manufacture result by an apparatus of the related art with a manufacture result by the manufacturing apparatus in the first embodiment in which only the cooling of the metal foil 11 is performed without heating. The configuration of the cooling portion 5 is similar to the experiment performed in the first embodiment.

In this experiment, a positive electrode was manufactured by use of positive granules with a solid content of 72% used as the granules 10, and an aluminum foil with a thickness of 12 μm as the metal foil 11. The manufacture of the electrode 12 was performed continuously around ten minutes such that the granules 10 were supplied while the metal foil 11 was conveyed at a conveyance speed of 30 to 60 m/min. Then, the electrode 12 was manufactured while a weight per unit area of a manufactured part was measured by in-line measurement, and hereby, fluctuations in the weight per unit area were observed. Note that components of the granules 10 and the standard of the weight per unit area are different from the condition in the experiment described in the first embodiment.

A result of the experiment is illustrated in a graph of FIG. 11. In this graph, the vertical axis indicates a magnitude of the weight per unit area, and the horizontal axis indicates a length of the electrode 12 manufactured continuously. In this graph, a result by the manufacturing apparatus 1000 of the present embodiment is indicated by a bold continuous line, a result by the manufacturing apparatus 100 of the first embodiment is indicated by a thin continuous line, and a result by the manufacturing apparatus of the related art is indicated by a broken line. The standard range of the weight per unit area in this experiment is a range indicated by an alternate long and short dash line in FIG. 11.

As illustrated in FIG. 11, a weight per unit area of an electrode 12 manufactured by the manufacturing apparatus of the related art gradually decreases, and falls short of the standard range at a deposition distance P1 in the figure. The weight per unit area of the electrode 12 manufactured by the manufacturing apparatus 100 of the first embodiment also gradually decreases, but does not fall short of the standard range until a deposition distance P2 that is quite longer than the deposition distance P1 of the related art. Also from this experiment result, with the manufacturing apparatus 100 of the first embodiment, it is possible to maintain the weight per unit area within an appropriate range and to continuously manufacture the electrode for a longer period of time than the related art. That is, it is also possible to obtain the effect of the present disclosure even by the first embodiment in which the cooling portion 5 is provided, but the heating portion 20 is not provided.

In the meantime, with the manufacturing apparatus 1000 of the second embodiment, it is possible to maintain the weight per unit area within the appropriate range and continuously manufacture the electrode for a further longer period of time than the manufacturing apparatus 100 of the first embodiment, as illustrated in FIG. 11. That is, with the manufacturing apparatus 1000 of the second embodiment in which the cooling portion 5 and the heating portion 20 are both provided, it is possible to obtain a more successful effect than the first embodiment.

As specifically described above, with the manufacturing method of the electrode of the second embodiment, the granules 10 are sandwiched, in the deposition gap G2, between the metal foil 11 cooled down by the cooling portion 5 and the B-roll 2 heated by the heating portion 20. Accordingly, the processing heat generated in the granules 10 actively moves to the metal foil 11, so that the increase in the temperature of the B-roll 2 is further restrained as compared with the first embodiment. Accordingly, even when the electrode is manufactured continuously for a long period of time, the deposition gap G2 is less likely to become small, thereby increasing a possibility that the thickness and the weight per unit area of the granules 10 in the electrode 12 thus manufactured can be maintained within an appropriate range.

Note that the present embodiment is merely an example, and does not limit the present embodiments. Accordingly, it goes without saying that the present disclosure can be altered or modified variously within a range that does not deviate from the gist of the present disclosure. For example, the present disclosure may be applied not only to the manufacturing method of the electrode for the lithium-ion secondary battery, but also to manufacturing methods for electrodes of various batteries, provided that the manufacturing methods are a manufacturing method of manufacturing a sheet-shaped electrode by forming a layer of a powder material on a metal plate.

Further, the configuration of the manufacturing apparatus 100 is not limited to the example illustrated in the embodiment. For example, the arrangement of the rolls 1, 2, 3, the diameters of the rolls, the magnitudes of the gaps between the rolls are not limited to the example illustrated herein. For example, rolls having the same diameter may be used as the rolls 1, 2, 3. Further, a supply method of the granules 10 is not limited to a method in which the granules 10 are supplied between the A-roll 1 and the B-roll 2. That is, the A-roll 1 may not be provided.

Further, in the present embodiment, FIG. 1 illustrates a set of three cooling rolls 51 to 53, but the number of cooling rolls may be any number, provided that the number of cooling rolls is one or more. However, it is preferable that a plurality of cooling rolls be provided because the coolability is increased. Further, in the embodiment, the cooling rolls 51 to 53 are rotatable, but a rotational driving force may be provided to at least one of them so as to convey the metal foil 11. Further, the auxiliary rolls may not be provided.

Further, FIG. 1 illustrates a configuration in which the coolant is supplied to three cooling rolls 51 to 53 from one chiller 6, but the coolant may pass through the three cooling rolls 51 to 53 sequentially. Alternatively, the cooling rolls 51 to 53 may be provided with respective chillers. With such a configuration, it is possible to supply respective coolants with different temperatures to the cooling rolls 51 to 53. Further, the cooling method by the cooling portion 5 is not limited to the cooling roll, but may be a method in which a metal foil passes through a cooling chamber or a method in which a cold blast is applied to a metal foil.

Further, in the manufacturing apparatus 100, the control of the preset temperature of the chiller 6 by the CPU 71 may not be performed. That is, B to D in FIG. 5 may not be provided. For example, the metal foil 11 may be cooled down to the dew point temperature or below. However, if the temperature is controlled to be higher than the dew point temperature, it is possible to restrain the adherence of water drops to the metal foil 11, which is preferable. Further, the feedback control may not be performed. That is, G and H in FIG. 5 may not be provided. Note that, if the feedback control is performed, the temperature can be made close to a more appropriate temperature, which is further preferable. If the temperature control is not performed, the temperature sensor 8, the temperature-humidity sensor 9, and the dew point temperature table 73 of the storage portion 72 are unnecessary.

Further, when the manufacture environment changes in the feedback control, the manufacture environment may be adjusted by use of a heating and cooling system, an air dryer, and the like.

Further, in the manufacturing apparatus 1000, the preset temperature of the cooling portion 5 and the preset temperature of the heating portion 20 should be set with a temperature difference of a predetermined temperature or more, and either of the preset temperatures may be determined first, or they may be determined independently. Further, a controller that controls the chiller 6 and a controller that controls the heater 21 are not limited to being provided integrally, and may be provided separately.

Further, the order of execution of the heating step J is not limited to one illustrated in FIG. 10, and the heating step J may be executed after the steps B to D. Alternatively, the heating step J may be omitted. For example, the heating may be performed in the cooling and heating step L after the heating temperature is determined in the heating temperature determination step K.

Further, the temperature control of the heating portion 20 and the feedback control may not be performed. In that case, the temperature sensor 22 may not be provided. For example, the heating may be continued after the heating is started by the heater 21. However, in the configuration in which the heating is continued, the surface temperature of the B-roll 2 may increase too high, so that the B-roll 2 expands and the weight per unit area of the electrode 12 may be reduced. Accordingly, it is preferable to perform the temperature control.

What is claimed is:

1. A manufacturing method of manufacturing an electrode by use of a first roll configured to convey an active material as a material containing an active material, and a second roll placed adjacent to the first roll in parallel to each other so as to convey a foil, such that the active material is transferred to the foil by rotating the first roll and the second roll in directions reverse to each other so as to form a layer of the active material on a surface of the foil, the manufacturing method comprising:
    cooling down the foil by use of a cooling device on an upstream side relative to the second roll in terms of a conveying direction of the foil, and
    transferring the active material to the foil having a temperature lower than an air temperature of a manufacture environment and is higher than a dew point temperature of the manufacture environment,
    wherein at a time of the cooling down the foil, the foil is cooled down such that a temperature of the foil after the cooling is lower than the air temperature of the manufacture environment and is higher than the dew point temperature of the manufacture environment.

2. The manufacturing method of manufacturing the electrode, according to claim 1, wherein:
    the cooling device includes a cooling roll; and
    at a time of cooling down the foil, the foil is cooled down such that the foil is brought into contact with the cooling roll while an outer peripheral surface of the cooling roll is maintained at a temperature lower than an air temperature of a manufacture environment.

3. The manufacturing method of manufacturing the electrode, according to claim 2, wherein:
    the cooling device includes a refrigerant supply portion configured to supply refrigerant to the cooling roll; and
    at the time of cooling down the foil, the refrigerant supply portion causes the refrigerant having a temperature lower than the air temperature of the manufacture environment to flow through the cooling roll.

4. The manufacturing method of manufacturing the electrode, according to claim 1, wherein
    the cooling device includes a sensor configured to output a signal that varies depending on the air temperature and a relative humidity of the manufacture environment;
    at the time of cooling down the foil, a temperature to cool down the foil in the cooling device is determined such that the air temperature and the relative humidity of the manufacture environment are acquired based on an output signal of the sensor, the dew point temperature is acquired from the air temperature and the relative humidity thus acquired, and further, the temperature of the foil after the cooling is lower than the air temperature thus acquired and is higher than the dew point temperature thus acquired.

5. The manufacturing method of manufacturing the electrode, according to claim 1, further comprising:
    heating the first roll such that a temperature of an outer peripheral surface of the first roll is higher, by a predetermined temperature or more, than the temperature of the foil after the cooling.

6. A manufacturing apparatus of manufacturing an electrode such that an active material as a material containing an active material is transferred to a foil so as to form a layer of the active material on a surface of the foil, the manufacturing apparatus comprising:
    a first roll configured to convey the active material;
    a second roll placed adjacent to the first roll in parallel to each other so as to convey the foil; and
    a cooling roll placed at a position where the cooling roll makes contact with the foil on an upstream side relative to the second roll in terms of a conveying direction of the foil, the cooling roll being configured such that a passage through which refrigerant passes is formed inside the cooling roll, and
    a heating portion configured to heat the first roll.

7. The manufacturing apparatus of manufacturing the electrode, according to claim 6, further comprising
    a refrigerant supply portion configured to supply the refrigerant to the cooling roll.

8. The manufacturing apparatus of manufacturing the electrode, according to claim 6, wherein
    a plurality of cooling rolls is provided.

9. The manufacturing method of manufacturing the electrode, according to claim 1 wherein the foil is a metal foil and the material containing an active material are granules.

10. A manufacturing method of manufacturing an electrode comprising
    conveying granules containing an electrode active material and binder using a first roll,
    conveying a foil using a second roll,
    transferring the spherical granules to the foil having a temperature lower than an air temperature of a manufacture environment and is higher than a dew point temperature of the manufacture environment, by rotating the first roll and the second roll in directions reverse to each other so as to form a layer of the granules on a surface of the foil, and
    cooling down the foil using a cooling device on an upstream side relative to the second roll in terms of a conveying direction of the foil.

11. The manufacturing apparatus of manufacturing the electrode, according to claim 6, further comprising a third roll adjacent to the first roll with a gap of 60 to 100 μm for supplying the active material.

12. The manufacturing apparatus of manufacturing the electrode, according to claim 6, wherein a gap between the first roll and the second roll is 10 to °μm.

* * * * *